US012409456B2

(12) United States Patent
Boschetti et al.

(10) Patent No.: US 12,409,456 B2
(45) Date of Patent: Sep. 9, 2025

(54) METHOD OF CONTROL OF THE ROTATION SPEED OF THE SHAFTS OF A DOUBLE SHAFT SHREDDER, PROGRAM FOR RUNNING THIS METHOD AND SHREDDER WHICH INCLUDES SUCH A PROGRAM

(71) Applicant: Zato S.p.A., Prevalle (IT)

(72) Inventors: Antonio Boschetti, San Gallo (IT); Alessandra Bresciani, Nuvolento (IT)

(*) Notice: Subject to any disclaimer, the term of this patent is extended or adjusted under 35 U.S.C. 154(b) by 0 days.

(21) Appl. No.: 18/856,532

(22) PCT Filed: Mar. 14, 2023

(86) PCT No.: PCT/IB2023/052442
§ 371 (c)(1),
(2) Date: Oct. 11, 2024

(87) PCT Pub. No.: WO2023/203397
PCT Pub. Date: Oct. 26, 2023

(65) Prior Publication Data
US 2025/0235877 A1 Jul. 24, 2025

(30) Foreign Application Priority Data
Apr. 20, 2022 (IT) ........................ 102022000007835

(51) Int. Cl.
*B02C 18/24* (2006.01)
*B02C 18/14* (2006.01)
*B02C 18/16* (2006.01)

(52) U.S. Cl.
CPC ............ *B02C 18/24* (2013.01); *B02C 18/142* (2013.01); *B02C 2018/164* (2013.01)

(58) Field of Classification Search
CPC .. B02C 18/24; B02C 18/142; B02C 2018/164
See application file for complete search history.

(56) References Cited

U.S. PATENT DOCUMENTS 4,529,134 A 7/1985 Williams
4,721,257 A * 1/1988 Williams ................ B02C 23/04
241/37.5

(Continued)

FOREIGN PATENT DOCUMENTS

CA 1218132 2/1987
EP 0015877 9/1980

*Primary Examiner* — Lee E Rodak
*Assistant Examiner* — Byung Ro Lee
(74) *Attorney, Agent, or Firm* — Themis Law

(57) ABSTRACT

A method for controlling the rotation speed of a first and a second shaft of an industrial shredder as described, for material to be sorted and/or disposed of, for example metal and non-metal scrap, that is intended to be shredded between blades of the shafts. The shredder is provided with pressure sensors, which detects the pressure on each shaft, and a control unit, which acts on the pumps that supply pairs of hydraulic motors connected to the shafts. When the pressure sensor detects that the pressure value of at least one shaft is greater than a pre-set threshold pressure value, the control unit reduces the initial flow rate value of at least one of the two pumps so as to reduce the rotation speed of the respective shaft and facilitate the shredding of the scrap material.

10 Claims, 4 Drawing Sheets

(56) References Cited

U.S. PATENT DOCUMENTS

| | | | | |
|---|---|---|---|---|
| 4,793,561 | A | 12/1988 | Burda | |
| 2005/0173570 | A1 * | 8/2005 | Tanaka | B02C 25/00 241/36 |

* cited by examiner

METHOD OF CONTROL OF THE ROTATION SPEED OF THE SHAFTS OF A DOUBLE SHAFT SHREDDER, PROGRAM FOR RUNNING THIS METHOD AND SHREDDER WHICH INCLUDES SUCH A PROGRAM

FIELD OF THE INVENTION

The present invention generally relates to the technical field of industrial shredders and it particularly relates to a method for controlling the rotation speed of the shafts of double-shaft shredder for the material to be sorted and/or disposed of, as well as a computer program which allows to carry out such method and a shredder with such resident program.

STATE OF THE ART

Industrial shredders for metal and non-metal scrap, for example light metals, heavy metals and non-ferrous scrap, are known.

The object of such shredders is to reduce the size of the cumbersome scrap or of the voluminous metals so as to facilitate sorting and disposal or recycling.

Typically, the most robust shredder includes a pair of facing shafts, provided with blades between which the scrap is made to pass through for shredding.

Each shaft is connected to a pair of hydraulic motors driven by a pump and electric or diesel engine system, in a per se known manner. Therefore, the rotation speed of the shafts is directly proportional to the flow rate of the pumps.

Furthermore, in a per se known manner, each shaft is connected with a pressure transducer which detects the pressure thereof caused by the resistance of the scrap to be shredded. The transducer communicates such datum to a control system or PLC.

However, such known shredders are subject to the jamming of the material to be shredded with ensuing blocking of the shredder, as well as significant time and financial loss on the entire disposal and sorting chain.

SUMMARY OF THE INVENTION

An object of the present invention is to at least partly overcome the aforementioned drawbacks, by providing a method for controlling the rotation speed of the shafts of a shredder that is particularly reliable.

Another object of the present invention is to provide a method which allows to reduce the possibility of the material jamming in the shredder.

A further object of the present invention is to provide a method which allows to reduce the full blocking of the operation of the shredder.

Another object of the present invention is to provide a method which allows to protect the shafts of the shredder from mechanical stress, to extend their service life.

These and other objects that will be more apparent hereinafter are attained by a method for controlling the rotation speed of the shafts of a shredder and/or by a computer program and/or by a shredder as described, illustrated and/or claimed herein.

The dependent claims describe advantageous embodiments of the invention.

BRIEF DESCRIPTION OF THE DRAWINGS

Further characteristics and advantages of the invention will be more apparent in light of the detailed description of some preferred but non-exclusive embodiments of the invention, illustrated by way of non-limiting example with reference to the attached drawings, wherein.

DETAILED DESCRIPTION OF SOME PREFERRED EMBODIMENTS

With reference to the aforementioned figures, herein described is a method for controlling the rotation speed of the shafts A1 and A2 of a double shaft industrial shredder T for metal and non-metal scrap, for example light metals, heavy metals and non-ferrous scrap, so as to reduce the size of the cumbersome scrap or of the voluminous metals to facilitate disposal or recycling and sorting.

The expression sorting is used to indicate dividing the components of the scrap into separate but homogeneous groups to send them to the respective destinations.

The shredder T may include pressure sensor means, for example two or more pressure transducers P1 and P2, each connected with a respective shaft A1 and A2.

Although in the description hereinafter the sensor means will be in the form of two pressure transducers P1 and P2, it is however clear that different types of pressure sensors or several pressure transducers connected to each shaft may be taken into account without departing from the scope of protection of the attached claims.

Advantageously, the transducers P1 and P2 may detect a pressure value Pp1, Pp2 exerted on each shaft A1 and A2 depending on the resistance to the passage of the scrap to be shredded therebetween.

The shredder 1 may also include a logic control unit UL comprising a CPU, for example a PLC.

Specifically, the transducers P1 and P2 may communicate the detected pressure value Pp1, Pp2 to the logic control unit UL.

The logic control unit UL may further be configured to compare the pressure value Pp1, Pp2 relating to each shaft A1 and A2 with a threshold pressure value P_threshold pre-set or which can be pre-set in the logic unit as explained below.

In addition, the shredder 1 may include two pairs of hydraulic motors, each connected with a shaft.

For example, a pair of hydraulic motors M1, M4 may be connected with the shaft A1, while a pair of hydraulic motors M2, M3 may be connected with the shaft A2.

However, it is clear that each shaft A1, A2 may be connected with only one hydraulic motor or three or more without departing from the scope of protection of the attached claims.

Furthermore, the motors M1 and M4 may be connected with a pump PO1 whose flow rate is regulated by a solenoid valve E1 connected with the control unit UL mentioned above.

On the other hand, the motors M2 and M3 may be connected with a pump PO2 whose flow rate is regulated by a solenoid valve E2 also connected with the control unit UL mentioned above.

Figure 3:
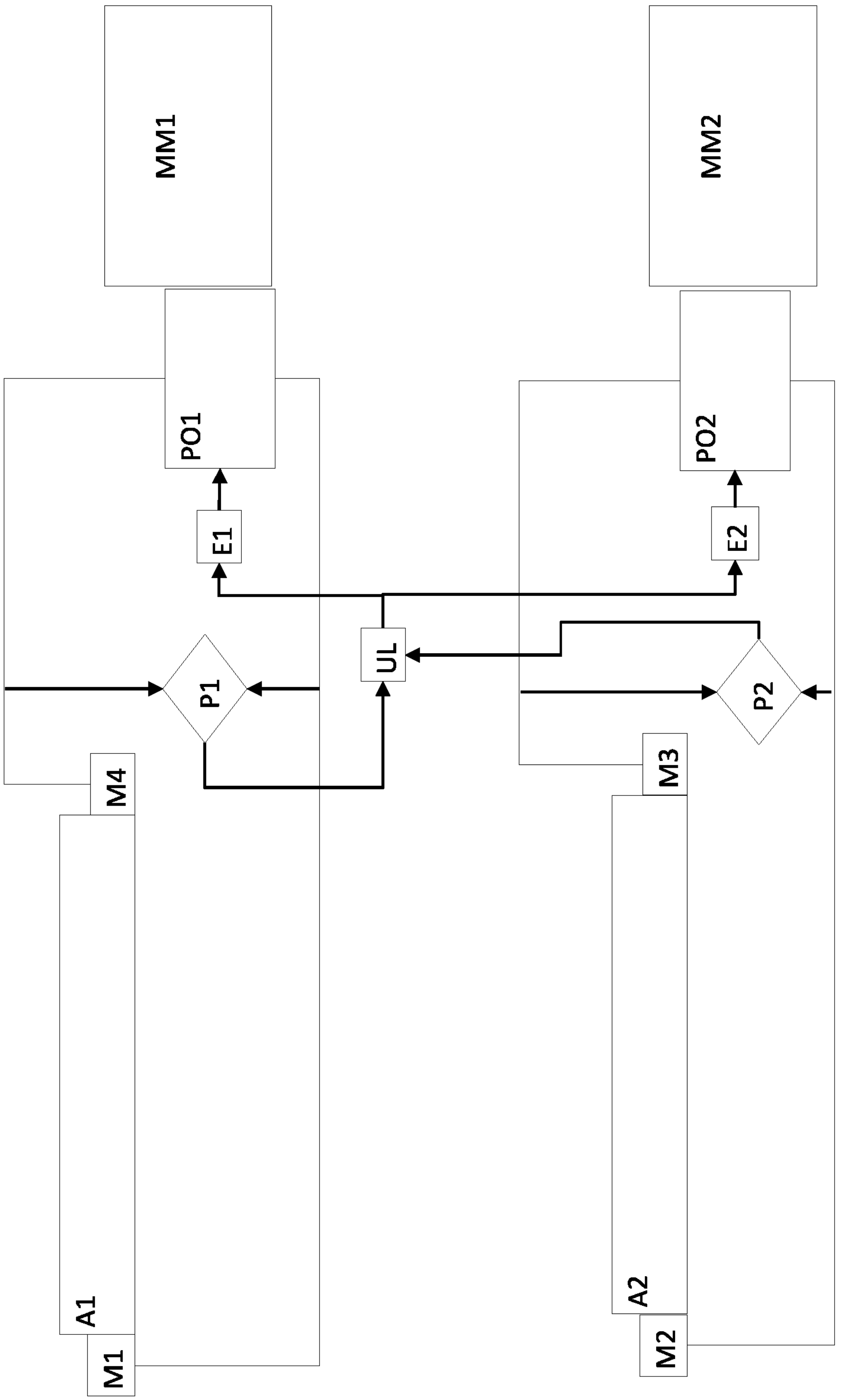
FIG. 3 is a schematic illustration of the shredder 1 wherein the pumps PO1 and PO2 are power-supplied by different motors.
Figure 4:
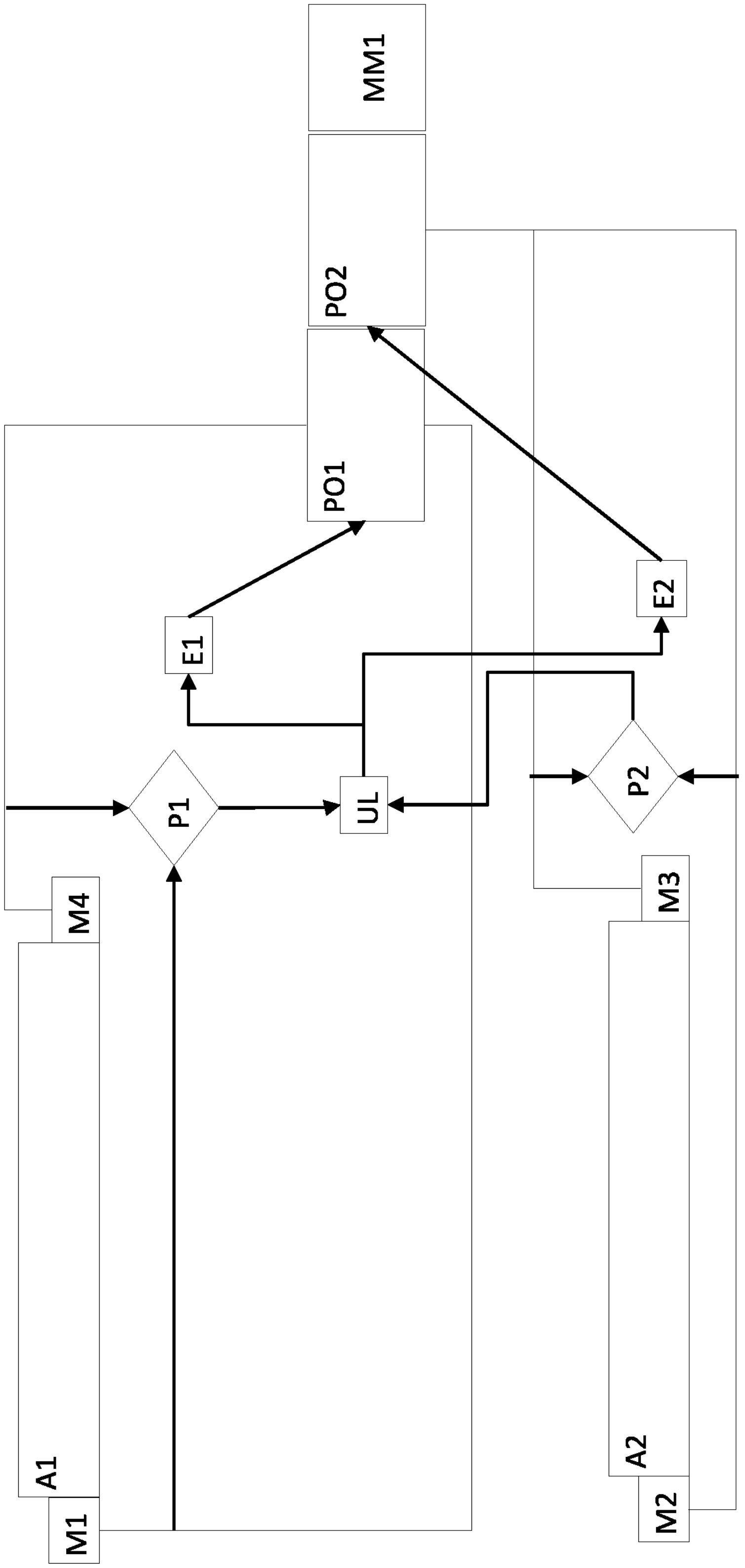
FIG. 4 is a schematic illustration of the shredder 1 wherein the pumps PO1 and PO2 are power-supplied by a single motor.

The pumps PO1 and PO2 may have a respective characteristic maximum flow rate Por1_max or Por2_max and they may be power-supplied by drive means, for example a single motor MM1, for example as shown in FIG. 4, or a respective motor MM1, MM2, for example as shown in FIG. 3.

The motors MM1 and MM2 may for example be electric or diesel motors, sized in a per se known manner.

Advantageously, the control method according to the invention may include some steps which may occur sequentially or iteratively in subsequent work periods.

Therefore, as regards the pump PO1 there may be defined a flow rate value at the beginning of the work period Por1_I and a flow rate value at the end of the work period Por1_F.

Similarly, as regards the pump PO2 there may be defined a flow rate value at the beginning of the work period Por2_I and a flow rate value at the end of the work period Por2_F.

In a time instant pre-defined in the control unit UL within a work period, there may be defined a detection by the transducers P1 and P2 of the pressure value Pp1 and Pp2 of the shafts A1 and A2.

It is clear that in such instant, the pumps PO1 and PO2 may have a flow rate value equal to the initial one Porl_1 and Por2_I.

Subsequently, the control unit UL may compare the detected value Pp1 and Pp2 with the pressure value P_threshold.

It is clear that the value P_soglia may be lower than the pressure value for blocking the rotation of the shafts A1 and A2, as well as of the shredder T, so as to act before the shredder is fully blocked due to scrap that is difficult to shred.

For example, the value P_threshold may be equal to 220 bars, while the blocking pressure value may be equal to 260 bars.

The values P_threshold and blocking pressure may be variable and they may be determined depending on the type and amount of material to be sorted and/or disposed of.

For example, as regards the type of material there may be considered characteristics such as the inherent nature of the material—for example if metal or non-metal—density and hardness.

It is therefore clear that such values may be set or are suitable to be set in the control unit UL before the step of detecting the pressure values Pp1 and Pp2 of the shafts A1 and A2.

From the aforementioned comparison, should even only one of the detected values be greater than or equal to the pressure value P_threshold, or the scrap creates a determined resistance to the passage through the shafts A1 and A2, causing an increase in the pressure value Pp1 and Pp2 on one of them, the final flow rate value Por1_F or Por2_F—obtained by reducing the initial flow rate Por1_I or Por2_I of one of the two pumps PO1, PO2 by a respective value R1 or R2—may be set by the control unit UL by acting on the respective solenoid valve E1 or E2.

It is clear that the final flow rate value may correspond to the initial flow rate value of the pump in a subsequent work period subsequent to the first work period.

Furthermore, it is clear that also the values R1 and R2 may be pre-set or suitable to be set in the control unit UL prior to the detection step of the transducers P1 and P2.

On the other hand, during the detection step, for example in a subsequent work period, should the detected pressure value Pp1 and Pp2 of both shafts A1 and A2 be lower than the threshold pressure value P_threshold, the logic unit UL may set the final flow rate value Por1_F or Por2_F equal to the maximum flow rate value Por1_max or Por2_max of the pump PO1, PO2 whose flow rate had been reduced.

Such values shall therefore be the initial flow rate values Por1_I and Por2_I in a subsequent work period.

In any case, the logic unit UL may set the final flow rate value Por1_F and/or Por2_F equal to the maximum flow rate value Por1_max and/or Por2_max when—in a work period—the detected pressure value Pp1 and Pp2 of both shafts A1 and A2 is lower than the threshold pressure value P_threshold, therefore without the flow rate of at least one of the pumps PO1, PO2 having been necessarily reduced previously.

Advantageously, the reduction of the flow rate of one of the pumps, will cause the reduction in rotation speed of the respective shaft A1 or A2, facilitating the shredding of the scrap.

As a matter of fact, should even only one shaft slow down, the pressure caused on it may be reduced, thus facilitating the operation of the shredder 1.

For example, an initial flow rate value of the pump PO1 or PO2 equal to 100% may be reduced by a value R1 or R2 for example by 60% so that the final flow rate Por1_F or Por2_F of the pump PO1 or PO2 is equal to 40%.

In a preferred but non-exclusive embodiment, the control unit UL may be configured to reduce the initial flow rate value Por1_I and Por2_I of both pumps PO1 and PO2 by acting on the respective solenoid valve E1 and E2 following the aforementioned comparison between the detected pressure values Pp1, Pp2 and the threshold pressure value P_threshold.

This will allow to reduce the rotation speed of both shafts A1 and A2, facilitating not only the shredding of the scrap, but also preventing the full blocking of the shredder 1.

Specifically, the initial flow rate Por1_I and Por2_I of the pumps PO1 and PO2 may be reduced respectively by the values R1 and R2 so as to obtain the final flow rate value Por1_F and Por2_F.

Even in this case, at a successive detection, should the detected pressure value Pp1 and Pp2 of both shafts A1 and A2 be lower than the threshold pressure value P_threshold, the logic unit UL will bring the pumps PO1 and PO2 to the maximum flow rate value Por1_max and Por2_max.

Therefore, these values will not only be the final flow rate values Por1_F and Por2_F of the current period but also the initial flow rate values Por1_I and Por2_I in a subsequent work period.

It is clear that also in this case the values R1 and R2 may be pre-set or suitable to be set in the control unit UL prior to the detection step of the transducers P1 and P2.

For example, the flow rate of the pump PO1 may be reduced by a value R1 equal to 20% to obtain a final 80% flow rate Por1_F, while the flow rate of the pump PO2 may be reduced by a value equal to 40% to obtain a final 60% flow rate Por2_F.

It is clear that also the opposite may occur, that is the flow rate of the pump PO1 may be reduced by a value R1 equal to 40% to obtain a final 60% flow rate Por1_F, while the flow rate of the pump PO2 may be reduced by a value equal to 20% to obtain a final 80% flow rate Por2_F.

It is clear that these values are purely for exemplifying purposes and they may vary depending on the type and amount of material, as described above.

Furthermore, it is clear that the first and second value R1 and R2 may be equal, for example equal to 50%, or one may be greater than the other, like in the example mentioned above or even, specifically, one may be twice larger than the other.

Figure 1:
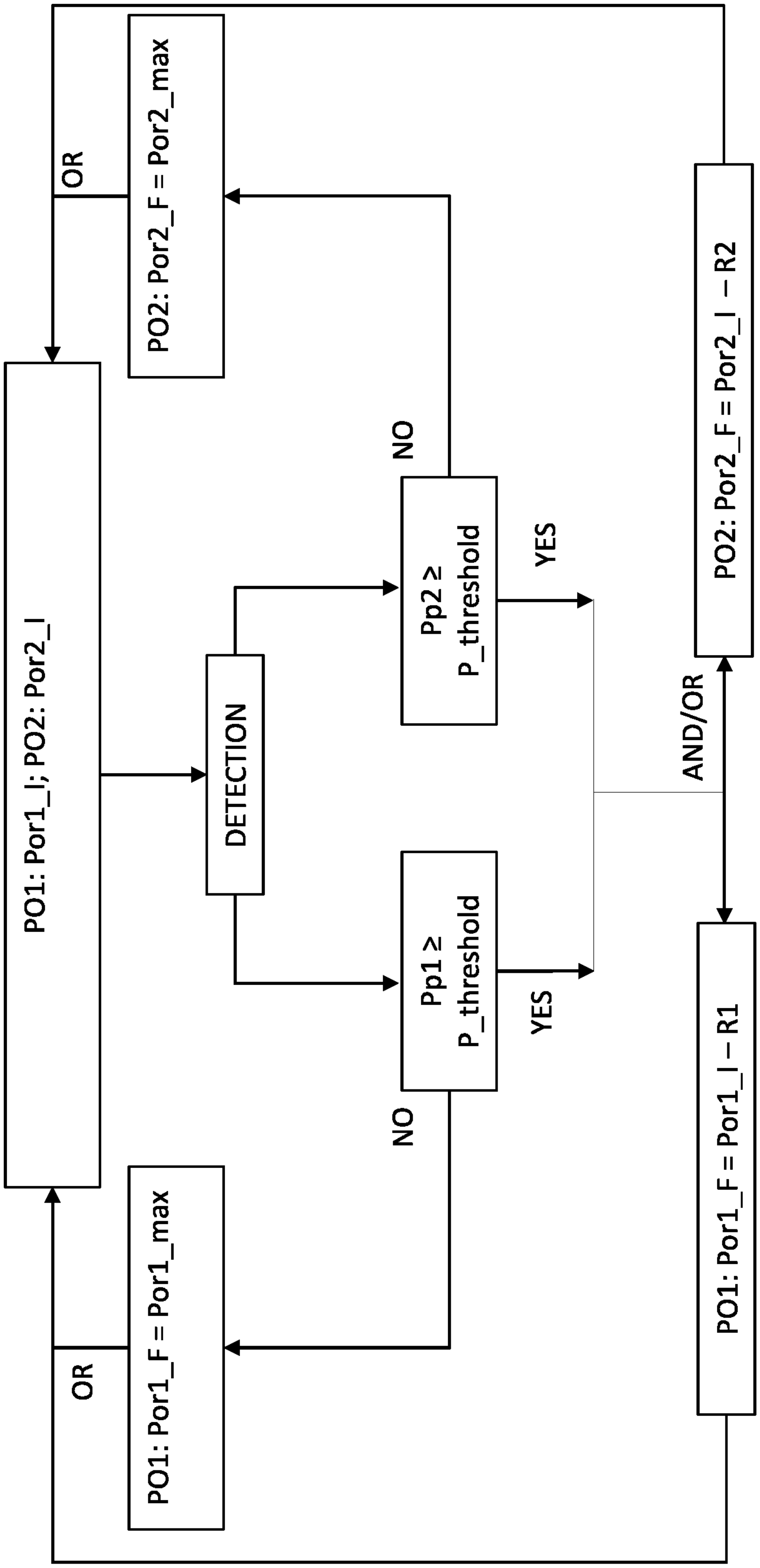
FIG. 1 shows a diagram of the method described.
Figure 2:
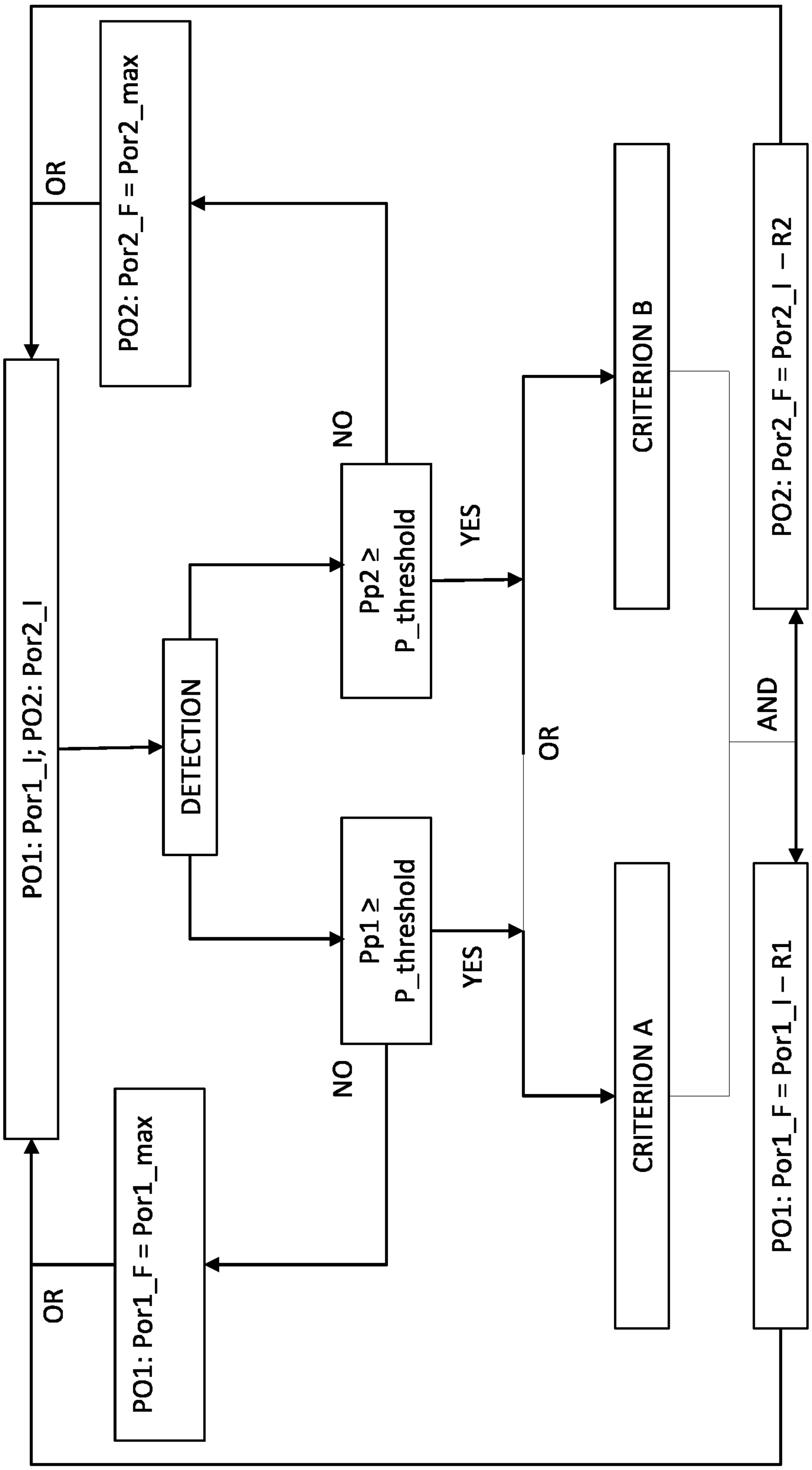
FIG. 2 shows a diagram of the method described wherein the change of the flow rate of the pumps PO1 and PO2 occurs provided a determined criterion is met.

In a further embodiment, shown in FIG. 2, the values R1 and R2 may be alternatively one larger than the other, so that the flow rate of the pump PO1 and of the pump PO2 may be reduced alternatively by the larger value depending on a pre-established criterion.

For example, considering 20% and 60% reduction values to obtain respective 80% and 40% flow rates, in the even days of the week (criterion A) the flow rate of the pump PO1 may be reduced by 20% (R1) and the flow rate of the pump PO2 by 60% (R2), while in the odd days (criterion B) the flow rate of the pump PO1 may be reduced by 60% (R1) and that of the pump PO2 by 20% (R2).

This will allow the homogeneous consumption of the blades of both shafts A1 and A2 so as to delay the maintenance operation with relative machine shut down as much as possible.

According to a further aspect of the invention, there may be provided for a computer program which can be installed in the CPU of the control unit UL which comprises instructions to command the control unit to run several steps of the method described above.

This means that such program may be installed in the CPU of any existing shredder T so as to allow the operation thereof based on the method described above.

According to a further aspect of the invention, there may be provided for a shredder T as described above, whose logic unit UL has installed a resident computer program which comprises instructions to command the logic unit to sequentially carry out the steps of the method described above.

In the light of the above, it is clear that the aforementioned method allows to reduce the possibility of the material jamming in the shredder and prevent the full blocking of the operation thereof.

Furthermore, the control logic will allow to protect the components of the shredder from the mechanical stress, to extend the service life thereof.

In the light of the above, it is clear that the invention attains the pre-set objectives.

The invention is susceptible to numerous modifications and variants. All details may be replaced by other technically equivalent elements, and the materials can be different depending on the technical needs, without departing from the scope of protection of the invention defined by the attached claims.

The invention claimed is:

1. A method for controlling a rotation speed of a first and a second shaft (AI, A2) of an industrial shredder (T) for materials to be sorted and/or disposed of, and intended to be shredded between blades of said first and said second shaft (AI, A2), the shredder (T) further comprising:

pressure sensor means (P1, P2) operatively connected to said first and said second shaft (AI, A2) to detect a pressure (Pp1, Pp2) caused on the first and the second shaft in relation to a resistance of a material to be shredded, at periodic time intervals in subsequent work periods;

a first and a second hydraulic motor (M1, M4; M2, M3) operatively connected respectively with said first and said second shaft (AI, A2) to impart a determined rotation speed thereto;

a first and a second hydraulic pump (P01, P02) respectively having an initial (Por1_II, Por2_I) and final (Por1_F, Por2_F) flow rate value in each work period and a predefined maximum flow rate value (Por1_max, Por2_max), each one of said first and a second hydraulic pump being operatively connected respectively to said first and said second hydraulic motor (M1, M4;

M2, M3), said at least one first and one said second pump (P01, P02) further being operatively connected to drive means (MM1, MM2) and a respective first and second solenoid valve (E1, E2) which regulates a flow rate thereof, the first and the second solenoid valve being proportional to the rotation speed of said first and said second shaft (AI, A2); and a logic control unit (UL) operatively connected with to said pressure sensors means (P1, P2) and said first and said second solenoid valve (E1, E2), said logic control unit (UL) being configured to compare a pressure value (Pp1, Pp2) detected by said pressure sensor means (P1, P2) with a predetermined threshold pressure value (P threshold) set or which can be set in said logic control unit (UL) and lower than a pressure value for blocking a rotation of said first and said second shaft (AI, A2), the logic control unit (UL) further being configured to act on said first and said second solenoid valve (E1, E2) so as to regulate the flow rate value of the respective first and second pump (P01, P02);

the method sequentially and iteratively comprising, in subsequent work periods, the steps of:

detecting, by said pressure sensor means (P1, P2), the pressure value (Pp1, Pp2) of the respective shaft (AI, A2) of said first and said second shaft (AI, A2) in a predetermined time instant within a work period;

comparing, by said logic control unit (UL), the pressure value (Pp1, Pp2) detected by said pressure sensor means (P1, P2) with the threshold pressure value (P threshold); and setting, by said logic control unit (UL), a final flow rate value (Por1_F, Por2_F) of said first and said second pump (PO1, P02);

wherein if said pressure value (Pp1, Pp2) detected by said sensor means (P1, P2) of at least one of said first and said second shaft (A1, A2) is greater than or equal to said threshold pressure value (P threshold), said setting step occurs by reducing the initial flow rate value (Por1_I, Por2_I) of at least one of said first and said second pump (PO1, P02) by at least one first or one second predetermined value (R1; R2) set or which can be set in the logic control unit (UL) to obtain a final flow rate value (Por1_F, Por2_F) lower than that of the initial flow rate (Por1 . . . I, Por2_I), so as to reduce the rotation speed of the respective shaft between said first and said second shaft (AI, A2) and facilitate the shredding of the material to be sorted and/or disposed of, that is interposed between the first and the second shaft (AI, A2); or wherein if said pressure value (Pp1, Pp2) detected by said sensor means (P1, P2) of both said first and second shaft (AI, A2) is lower than said threshold pressure value (P+threshold), said setting step occurs by regulating the final flow rate value (Por1_F, Por2_F) of said first and second pump (PO1, P02) equal to the respective maximum value (Por1_max, Por2_max).

2. The method according to claim 1, wherein the final flow rate value (Por1_F, Por2_F) of said first and said second pump (PO1, PO2) in a first work period corresponds to the initial flow rate value (Por1_I, Por2_I) of said first and said second pump (PO1, PO2) in a second work period subsequent to the first work period.

3. The method according to claim 1, wherein if said pressure value (Pp1, Pp2) detected by said pressure sensor means (P1, P2) is greater than or equal to said threshold pressure value (P threshold), said setting step occurs by reducing by said control means, said at least one first and said second value (R1; R2) by the initial flow rate value (Por1_I, Por2_I) of both said first and said second pump (PO1, PO2) so as to reduce the rotation speed of each of said first and said second shaft (A1, A2).

4. The method according to claim 3, wherein said at least one first and second predetermined value (R1; R2) are equal to each other.

5. The method according to claim 3, wherein one of said at least one first and second predetermined value (R1; R2) is greater than the other one.

6. The method according to claim 5, wherein said at least one first and second value (R1; R2) are alternatively one greater than the other one so that the initial flow rate value (Por1_I, Por2_I) of said first and said second pump (PO1, PO2) is selectively reduced by at least one first or second predetermined value (R1; R2) depending on a predetermined criterion (criterion A; criterion B) set or which can be set in said logic control unit (UL) to alternate a reduction of the rotation speed of the respective shaft (A1, A2) of said first and said second shaft (A1, A2).

7. The method according to claim 6, wherein said predetermined criterion (criterion A; criterion B) corresponds to an alternation of days of a week.

8. The method according to claim 1, wherein before said step of detecting, there occurs a step for setting, in said logic control unit (UL), said at least one first and said second predetermined value (R1; R2) and/or said threshold pressure value (P threshold) and/or said blocking pressure value depending on type and/or amount of material to be sorted and/or disposed of.

9. A non-transitory computer-readable medium including computer program comprising instructions for controlling an operation of an industrial shredder (T) for materials to be sorted and/or disposed of and having a first and a second shaft (A1, A2), the shredder (T) further comprising:

pressure sensor means (P1, P2) operatively connected to said first and said second shaft (A1, A2) to detect a pressure (Pp1, Pp2) caused on the first and the second shaft (A1, A2) in relation to a resistance of a material to be shredded, at periodic time intervals in subsequent work periods;

a first and a second hydraulic motor (M1, M4; M2, M3) operatively connected respectively with said first and said second shaft (A1, A2) to impart a determined rotation speed thereto;

a first and a second hydraulic pump (PO1, PO2) respectively having an initial (Por1_I, Por2_I) and a final (Por1_F, Por2_F) flow rate value in each work period and a predefined maximum flow rate value (Por1_max, Por2_max), each of said first and said second hydraulic pump (PO1, PO2) being operatively connected respectively to said first and said second hydraulic motor (M1, M4; M2, M3), said first and said second pump (PO1, PO2) further being operatively connected with drive means (MM1, MM2) and a respective first and second solenoid valve (E1, E2) which regulates a flow rate thereof, the first and the second solenoid valve (E1, E2) being proportional to the rotation speed of said first and second shaft (A1, A2); and a logic control unit (UL) operatively connected to said pressure sensor means (P1, P2) and said first and said second solenoid valve (E1, E2), said logic control unit (UL) being configured to compare a pressure value (Pp1, Pp2) detected by said pressure sensor means (P1, P2) with a predetermined threshold pressure value (P threshold) set or which can be set in said logic control unit (UL) and lower than a pressure value for blocking the rotation of said first and said second shaft (A1, A2), the logic control unit (UL) further being configured to act on said first and said second solenoid valve (E1, E2) so as to regulate the flow rate value of the respective first and second pump (PO1, PO2);

the program being configured to be installed or being installed in said logic control unit (UL), instructions commanding the logic control unit (UL) being such to sequentially and iteratively carry out the steps of the method according to claim 1.

10. An industrial shredder (T) for a material to be sorted and/or disposed of, comprising:

a first and a second shaft (A1, A2), the material to be sorted and/or disposed being shredded between blades of the first and the second shaft (A1, A2);

pressure sensor means (P1, P2) operatively connected to said first and said second shaft (A1, A2) to detect a pressure value (Pp1, Pp2) caused on the first and the second shaft in relation to a resistance of the material to be shredded, at periodic time intervals in subsequent work periods;

a first and a second hydraulic motor (M1, M4; M2, M3) operatively connected respectively to said first and said second shaft (A1, A2) to impart a determined rotation speed thereto;

a respectively having an initial (Por1_I, Por2_I) and final (Por1_F, Por2_F) flow rate value in each work period and a predefined maximum flow rate value (Por1_max, Por2_max), each of the first and the second hydraulic pump (PO1, PO2) being operatively connected respectively to said first and said second hydraulic motor (M1, M4; M2, M3), said first and said second pump (PO1, PO2) further being operatively connected to drive means (MM1, MM2) and a respective first and second solenoid valve (E1, E2) which regulates a flow rate thereof, the first and the second solenoid valve (E1, E2) being proportional to the rotation speed of said first and said second shaft (A1, A2); and a logic control unit (UL) operatively connected to said pressure sensor means (P1, P2) and said first and said second solenoid valve (E1, E2), said logic control unit (UL) being configured to compare the pressure value (Pp1, Pp2) detected by said pressure sensor means (P1, P2) with a predetermined threshold pressure value (P threshold) set or which can be set in said logic control unit (UL) and lower than a pressure value for blocking a rotation of said first and said second shaft (A1, A2), the logic control unit (UL) further being configured to act on said first and said second solenoid valve (E1, E2) so as to regulate the flow rate value of the respective first and second pump (PO1, PO2), the logic control unit (UL) including the non-transitory computer-readable medium including the computer program according to claim 9.

* * * * *